Feb. 20, 1951
F. M. POOLE ET AL
2,542,260
RELAY FOR RECTIFYING FLOW OF FLUIDS THROUGH CONTROL VALVES
Filed May 3, 1946
3 Sheets-Sheet 3
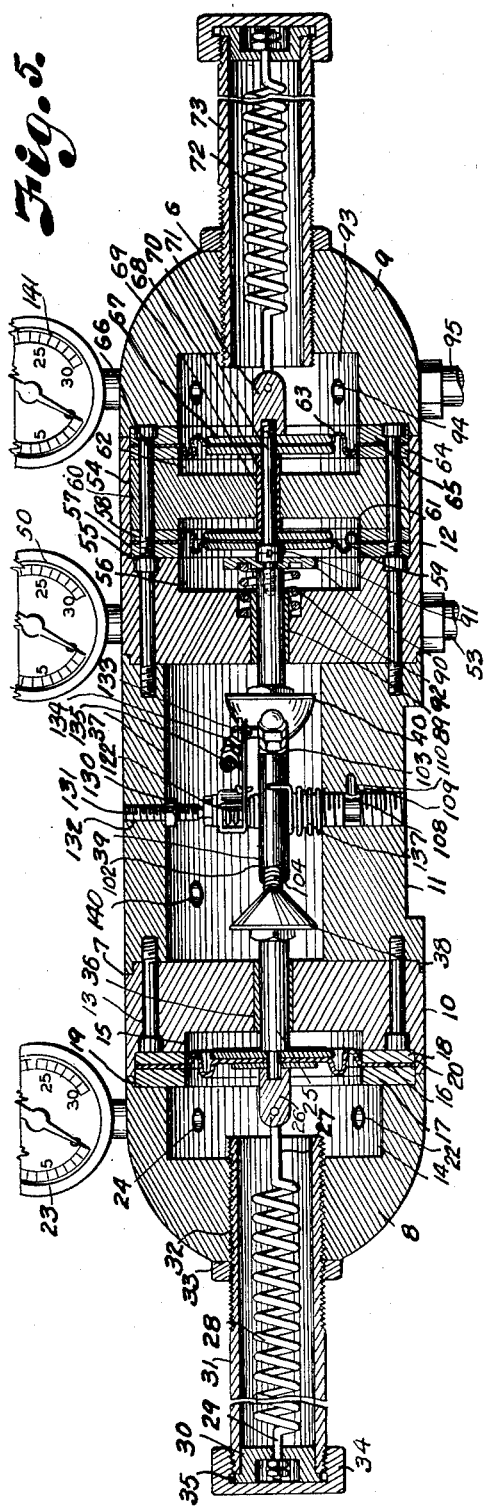
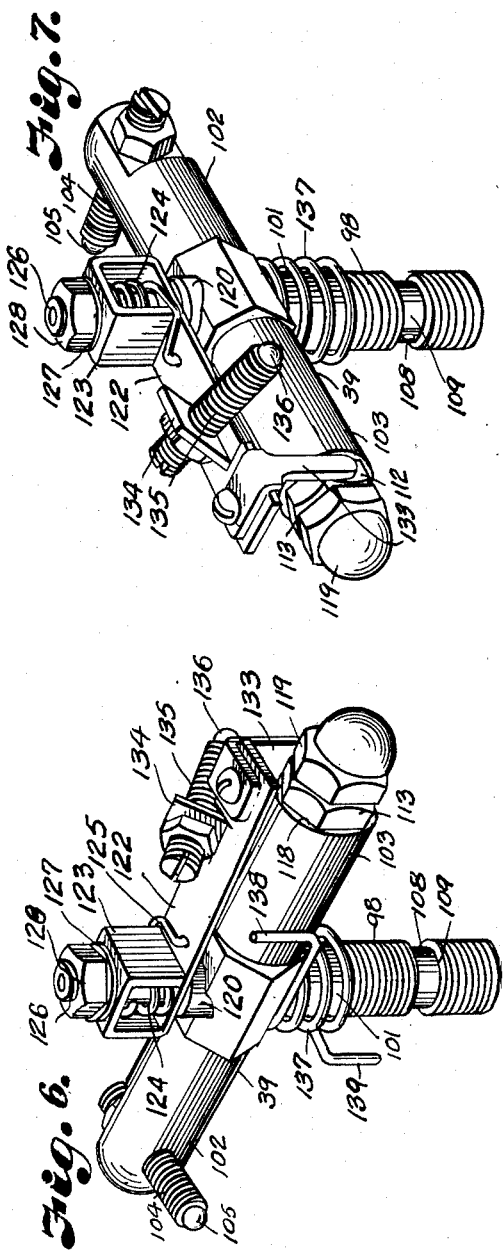
INVENTORS
F. M. POOLE, AND
H. B. MANLEY
BY *Fishburn + Mullendore*
ATTORNEYS Patented Feb. 20, 1951

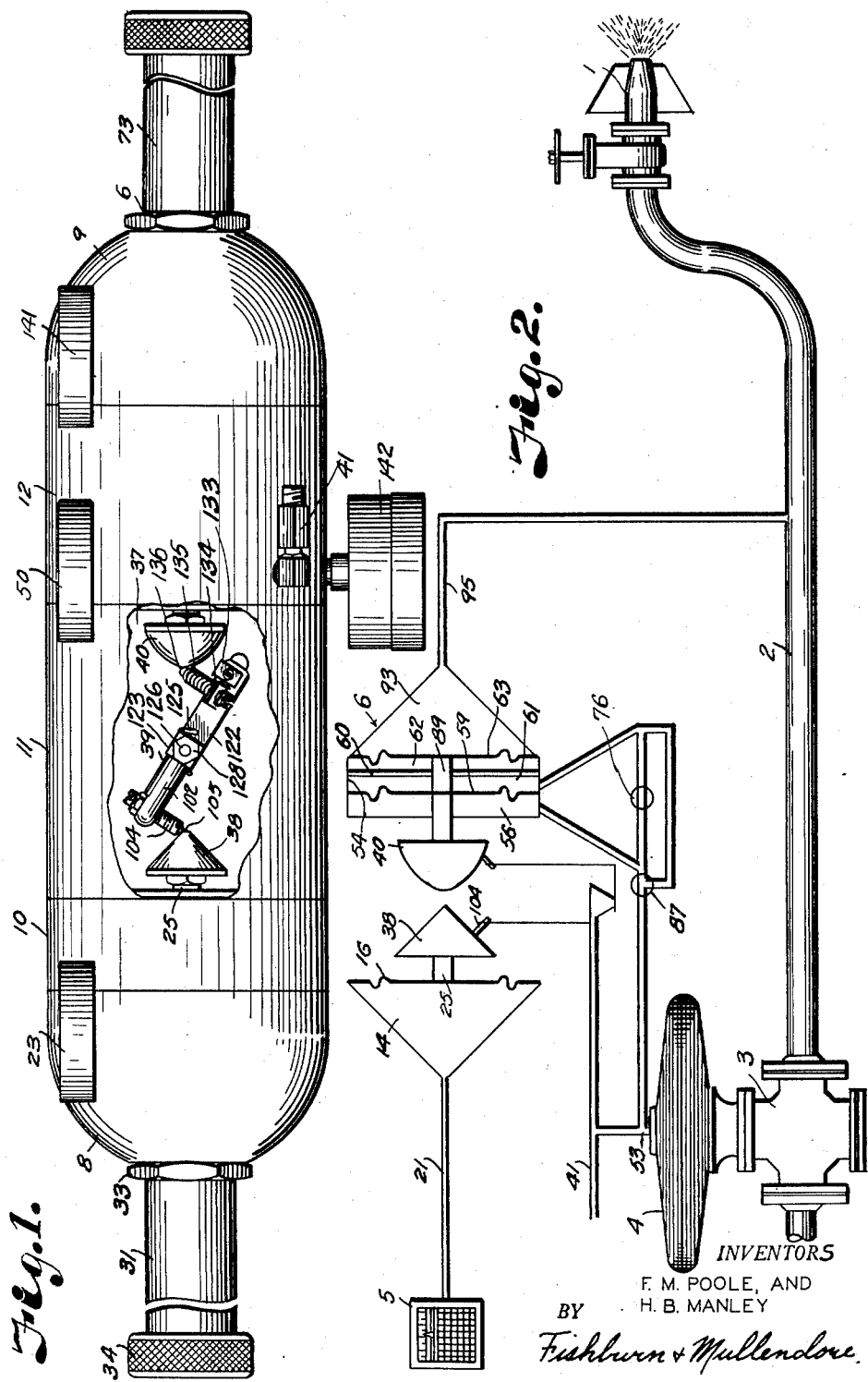

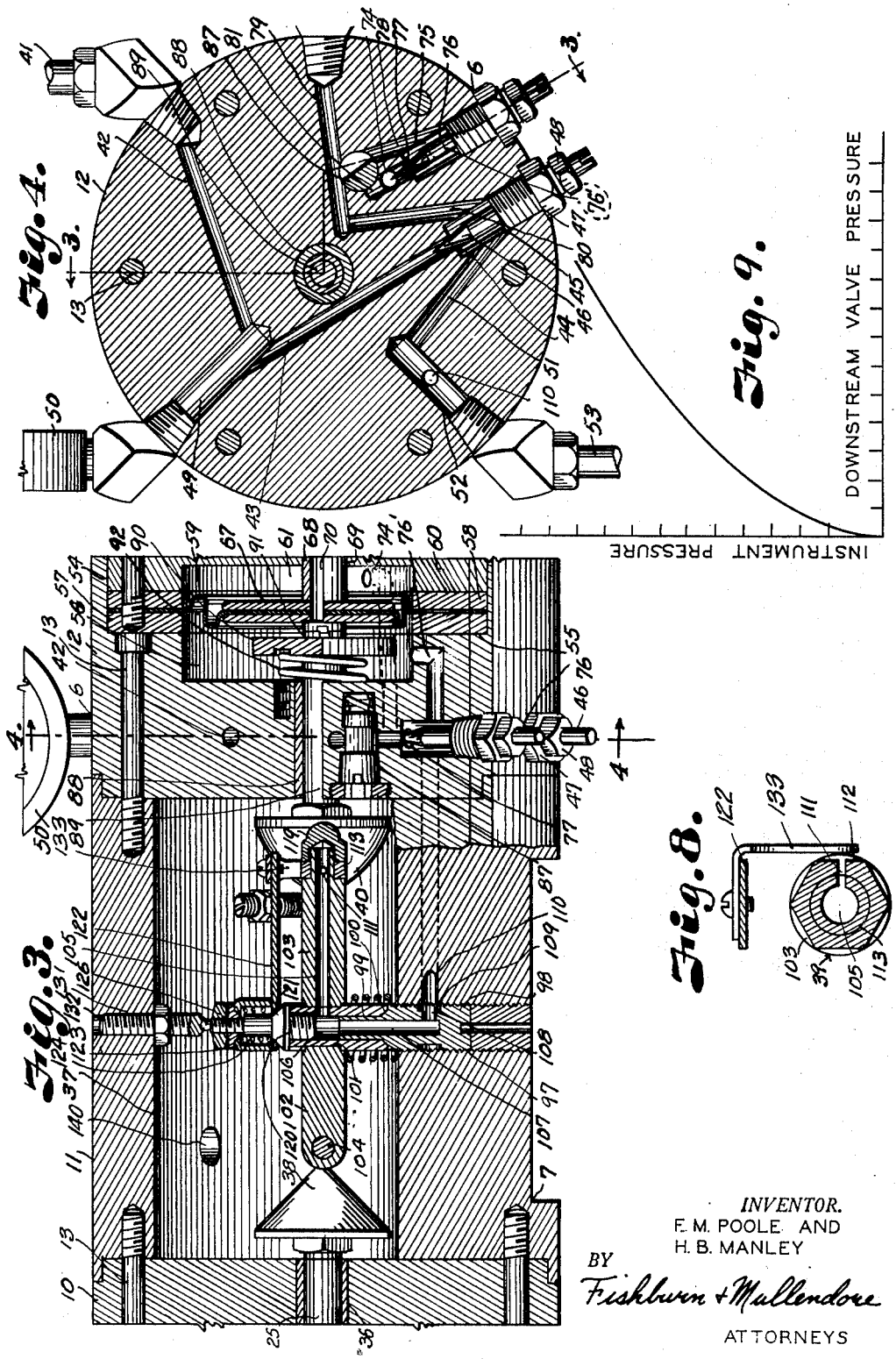

2,542,260

UNITED STATES PATENT OFFICE 2,542,260

RELAY FOR RECTIFYING FLOW OF FLUIDS THROUGH CONTROL VALVES

Foster M. Poole, Dallas, Tex., and Humes B. Manley, Kansas City, Mo.

Application May 3, 1946, Serial No. 666,898

11 Claims. (Cl. 137—153)

This invention relates to relays for rectifying flow of fluids through control valves, which valves are operated responsive to temperature, flow pressure, liquid level, or other variable factors. In valves of this character, it is impossible to reflect equal increments of deviation of the controlling factor in equal percentage increments of flow change in the fluid flowing through the control valve over the entire range of valve operation.

It is, therefore, the principal object of the present invention to provide a relay mechanism to translate equal increments of deviation in the controlling factor into substantially equal percentage increments of flow change of the controlled fluid.

Other objects of the invention are to provide a relay device of this character that is of simple construction, reliable in operation, and which automatically compensates for control valve inertia, sticking valve stems, foreign matter in the valve, worn and distorted inner valves, and similar difficulties ordinarily tending to interfere with proper functioning of a valve.

A further object of the invention is to permit use of less expensive control valves and at the same time obtain the desired change in ratio between the controlling factor and the flow through the valve.

It is also an object of the invention to provide a relay for translating movement of the actuating element of a control instrument to the pressure control medium of a pressure actuated valve.

In accomplishing these and other objects of the invention hereinafter pointed out, we have provided improved structure, the preferred form of which is illustrated in the accompanying drawings wherein:

Fig. 1 is a side elevational view of a relay embodying the features of the present invention.

Fig. 2 is a diagrammatic view of the relay connected with a valve controlling flow of fuel to the burner.

Fig. 3 is an enlarged section through the relay on the line 3—3 of Fig. 4.

Fig. 4 is a cross section through the relay on the line 4—4 of Fig. 3.

Fig. 5 is a longitudinal section through the relay.

Fig. 6 is a perspective view of the flapper valve arm assembly.

Fig. 7 is a similar view of the assembly from the opposite side.

Fig. 8 is a section through the vent port and flapper valve.

Fig. 9 is a graph showing the relationship of instrument pressure to the downstream valve pressure.

Referring more in detail to the drawings:

1 designates a burner nozzle such as used in furnaces and the like and which is supplied with fuel; for example, gas, through a pipe 2 under control of a valve 3 which is actuated by a diaphragm motor 4 under control of an actuating instrument 5. The instrument 5 may be temperature responsive so as to maintain predetermined temperature conditions in the furnace by automatically controlling the flow of fuel thereto.

As above mentioned, in a control system of this character, equal increments of deviation in the control valve are not reflected in equal percentage increments of flow change in the gas flowing through the control valve over the entire range of valve regulation. This is true even though valve positioners or characterized inner valves are used in the control valve.

This difficulty is overcome in the present invention through provision of a relay generally designated 6 including a housing 7 comprising end sections 8 and 9 and intermediate sections 10, 11 and 12 connected together by suitable fastening devices such as cap screws 13. The end section 8 and adjacent section 10 have coaxial chambers 14 and 15 respectively separated by a flexible diaphragm 16. The marginal edge of the diaphragm is clamped between rings 17 and 18 inserted within shoulder-like grooves 19 and 20 encircling the respective chambers so that the diaphragm is adapted to be moved responsive to actuations of the control instrument 5 as transmitted through a pressure medium such as air in a pipe 21 having inlet into the chamber 14 through a port 22. The pressure acting in the chamber 14 may be indicated by a pressure gauge 23 having connection with the port 24 opening into the chamber 14 as best shown in Fig. 5. In order to return the diaphragm upon drop of pressure in the chamber 14, the diaphragm carries an axial stem 25 having a head 26 fixed thereon for connection with one end 27 of a coil spring 28 and which has its opposite end 29 secured in an anchor member 30 seated on the outer end of a tubular spring housing 31 which is adjustably threaded into an axial bore 32 of the end section 8 of the housing so as to regulate action of the spring. The tubular spring housing 31 is retained in adjusted position by means of a jamb nut 33 threaded thereon and engaging the end of the housing section 8. The spring anchoring member 30 is retained in fixed position on the end of the tubular spring housing by a cap 34 which clamps a flange 35 on the anchor member 30 against the end of the spring housing. The diaphragm stem 25 extends through a bushing 36 in the axis of the section 10 and projects within a flapper valve compartment 37 in the central section 11 to carry a cam member 38 which, in the illustrated instance is of cone shape and has a linear contour to give a proportional lateral position to a valve supporting arm 39 in accordance with variation of the actuating pressure in the chamber 14. Thus, when the instrument 5 causes the pressure fluid to move the diaphragm against action of the spring, the cam member 38 is moved in one direction within the compartment 37 and when the pressure from the instrument is relieved, the spring is effective to effect return of the cone-like cam member 38 in the opposite direction. Thus, the cone-like cam is positioned longitudinally within the compartment 39 in exact conformity with the requirements of the control instrument 5.

The conical cam member 38 is utilized in association with a cam element 40 to regulate pressure of an actuating medium on the diaphragm motor 4 of the control valve 3. The actuating pressure medium for the diaphragm motor 4 is supplied through a pipe 41 which connects with a channel 42 in the section 12 of the relay housing which in turn is connected by a channel 43 with a port 44 that is formed in the bottom of a counterbore 45 also formed in the section 12 to mount a needle valve 46. The needle valve is carried in a bushing 47 threaded into the counterbore and which is sealed with respect to the needle valve by a packing nut 48. The channels 42 and 43 preferably connect through a channel 49 with a pressure gauge 50 for indicating the pressure at which the actuating medium is being supplied. The needle valve thus provides a restriction so as to maintain a pressure condition within the counterbore 45 which is proportional to the degree which a flapper valve covers a port as later described. The counterbore 45 has an outlet channel 51 that connects with a channel 52 also in the section 12 as shown in Fig. 4. The channel 52 is connected by a pipe 53 with the diaphragm motor 4 of the valve.

The housing section 12 has a recess 54 opening from the end thereof adjacent the end section 9 of the housing and which terminates in an annular shoulder 55 encircling a diaphragm chamber 56. Seated on the shoulder is a clamping ring 57 cooperating with the clamping ring 58 for anchoring a flexible diaphragm 59 therebetween and to close the outer side of the chamber 56. Also inserted within the recess 54 is a partition member 60 that has recesses 61 and 62 on the respective sides thereof to respectively accommodate movement of the diaphragm 59 and a diaphragm 63. The diaphragm 63 is similarly clamped between rings 64 and 65 and the parts are secured in assembly by fastening devices such as cap screws 66. The diaphragms 59 and 63 are backed on their respective sides by plates 67 and are spaced apart by a sleeve 68 that is slidable longitudinally in a bearing 69 carried in the partition. The plates are retained in clamping engagement with the diaphragms and with the spacing sleeve by a fastening device 70 that extends through axial openings in the respective plates and diaphragm and through the sleeve to anchor a stem 71 similar to the stem 25 previously described. The stem 71 is connected with a coil spring 72 that is enclosed within a tubular spring housing 73 and is anchored at the outer end to the spring housing in the same manner as the spring housing previously described. The spring housing 73 is also adjustable within the end section 9 to vary action of the spring on the diaphragms 59 and 63.

The diaphragm chamber 56 is connected by a channel 74 shown in dotted lines (Fig. 4) and which opens into a counterbore 75 alongside the counterbore 45. The counterbore 75 also accommodates a process synchronizing needle valve 76 mounted in the same manner as the needle valve previously described and which controls flow through a port 77 in the bottom of the counterbore and which connects through a channel 78 with a supply channel 79 that in turn is connected through a channel 80 with the counterbore 45. The channel 79 is also connected with the counterbore 75 by a channel 81. The connection of the channels 78, 79 and 81 are controlled by a plug valve 87 whereby full pressure of the fluid may be supplied from the supply channel 79 to the chamber 57 and after a few seconds delay to the chamber 61 or vice versa depending upon the type of motor actuated valve 3. The setting of the valve illustrated is for a reverse acting diaphragm motor valve, pressure medium being supplied through port 77 and channel 76' under full pressure to the chamber 56 and in restricted flow to the chamber 61 through the port 77, channels 81 and channel 74. The other setting of the three-way valve is for a direct acting diaphragm motor valve 3 and in this setting the supply channel 79 is directly connected with the channel 81 to supply pressure through the channel 74 while restricted pressure is supplied through the port 77 and channel 76' to the chamber 56. When the three-way plug valve is positioned for a given diaphragm motor valve, it retains that position unless the type of valve is changed.

A bearing 88 is located in the axis of the housing section 12 and a stem 89 of the cam member 40. The opposite end of the stem 89 carries a washer-like head 90 that is retained thereon by a cap screw 91 and which abuts against the cap screw 70 previously described, the heads of the cap screws being retained in contact by a coil spring 92 that is sleeved over the stem 89 and which has one end bearing against the washer and its opposite end in the recess in the bottom of the housing section 12.

The end section 9 of the housing also has a pressure chamber 93 which is connected through a port 94 with a pipe 95 leading to and connecting with the gas supply pipe 2 on the downstream side of the control valve 3 whereby pressure of the gas on the downstream side of the control valve is transmitted through the pipe 95 to act on the diaphragm 63 in opposition to the spring 72 and to effect positioning of the cam member 40 relatively to the cam member 38 as governed by the pressure of the diaphragm motor actuated pressure medium in the chamber 56.

When the fluid in the pipe 2 is a gas as in the case illustrated, the burner tip is in effect an orifice with approximately atmospheric pressure on one side and control valve downstream pressure on the other side. Under these conditions, the downstream flow of gas through the pipe 2 is proportional to the square root of the control valve downstream gas pressure. The cam member 40 is, therefore, provided with a square root shaped contour to cooperate with the linear surface contour of the other cam member in controlling pressure of the diaphragm motor actuating fluid so as to translate equal increments of deviation in the control instrument 5 into substantially equal percentage increments of flow change in the gas as now to be described.

Formed substantially midway of the length of the central housing section 11 is an internally threaded bore 97 that mounts a threaded body member 98 carrying a spindle 99 of smaller diameter to form a tapered shoulder 100 in encircling relation with the spindle. The spindle 99 projects within the chamber 37 and mounts a hub 101 of the arm 39 having one end 102 extending in the direction of the cam member 38 and an opposite end 103 extending in the direction of the cam member 40. Adjustably carried by the end 102 of the arm is a pin 104 having a ball end 105 for engaging the linear surfaces of the cam member 38 as shown in Fig. 1 whereby the arm is positioned on the spindle responsive to positioning of the cam member 38 by the instrument 5. The end 103 has a longitudinal bore 105 that connects with an axial bore 106 in the hub 101 which in turn connects with a bore 107 in the spindle 99. The spindle bore 107 connects through a lateral port 108 with an annular recess 109 that is formed circumferentially of the threaded body member 98 of the spindle to assure interconnection of the port 108 with a channel 110 which connects with the bore 52 previously described. Therefore, a portion of the actuating medium delivered to the motor diaphragm of the control valve is passed through the channel 110, port 108, bores 107 and 105 for escape through a lateral vent port 111 which is formed in the flattened side 112 of a nozzle member 113, which member is mounted on a reduced extension 114 of the arm and which is clamped against a shoulder 118 by a nut 119 best shown in Figs. 6 and 7. The upper end of the bore in the hub 101 is closed by a plug 120 having a conical seat 121 for mounting an arm 122. The arm 122 is preferably formed of flat material and has one end bent to form a boss-like loop 123 adapted to contain a coil spring 124 therein and which has one end 125 anchored to the arm 122 and the other end anchored to a spindle 126 that is carried by the plug 120. The arm is retained in contact with the conical head of the plug by a washer 127 backed by a jamb nut 128. The end of the spindle preferably has a socket 129 for containing an antifriction ball 130 that is carried by an adjusting screw 131 adjustably threaded into a bore 132 in axial alignment with the bore 97 on the opposite side of the housing section as best shown in Fig. 3. The arm 122 extends outwardly over the end 103 of the arm 39 and carries a depending valve flap 133 that is adapted to close the vent port when the arms are substantially in parallel registry as shown in Fig. 7. In order to adjust the position of the arm 122 with respect to the square root surface of the cam member 40, the arm 122 has an angularly extending lug 134 adjustably carrying a threaded screw 135 having a ball end 136 for engaging the square root surface of the cam member 61. The screw 104 on the arm 39 is kept in yielding contact with the linear surface of the cam member 38 by a coil spring 137 having one end 138 engaging a side of the arm and its opposite end 139 anchored to an opening in the central housing 11. With this construction, it is obvious that the spring 137 retains the screw 104 on the arm in contact with the cam member 38 so as to maintain relational position of the vent port 111, in the opposite end of the arm relatively to the valve flapper 133 which in turn is positioned by the point on which the ball end of the screw 135 engages the square root surface of the cam member 40. The chamber 37 in the housing section 11 is provided with a vent 140 in the side thereof for releasing the pressure medium vented through the vent port as now to be described. The downstream control valve pressures in the diaphragm chamber 93 are to be noted on a gauge 141 and the pressures in the chamber 56 are noted on a gauge 142.

Assuming that the relay is assembled as described, it is installed between the control instrument and adjacent to the diaphragm motor control valve. Gas or air under pressure can be used as a source of power to operate the motor valve. If gas is used the vent 140 is connected with the furnace, thereby burning up gas discharged through the nozzle port 111. In operation, the control instrument 5 effects positioning of the cam 38 through the actuating pressure medium acting on the diaphragm 16 through the pipe 21. As the cam member 38 is moved longitudinally within the compartment 39 the contour thereof causes the arm 39 to swing in a clockwise direction (Fig. 1) proportionate to the pressure effected by the control instrument to effect a proportional lateral position of the nozzle 113. The cam member 40 effects similar positioning of the valve flapper 133, the cam member 40 being positioned responsive to the flow pressure on the downstream side of the control valve acting through the pipe 95 on the diaphragm 63 which shifts the cam member 40 against action of the spring 72 and influenced by pressure differential occurring in the respective sides of the diaphragm 59. Upon initial movement, the pressure acting in the chamber 56 on the lefthand side of the diaphragm 59 is at full pressure of the diaphragm motor valve actuating medium which acts in opposition to the pressure of the gas on the downstream side of the control valve. The pressure in the chamber 56 is opposed by the pressure acting on the opposite side of the diaphragm 59 through the resistance effected by the process synchronizing valve 76. The cam member 40, therefore, takes a longitudinal position proportional to the algebraic sum of the nozzle pressure differential across the diaphragm 59 and downstream diaphragm motor controlled pressure and in doing so a lateral position is given to the valve flapper in accordance with the square root surface of the cam member 40. The pressure differential within the chambers 56 and 61 is finally reduced to zero. If the momentary position of the valve flapper 133 does not cover the vent port 111 sufficiently to balance the air vented through the nozzle against the air supplied through the resistance effected by the valve 46, the air pressure on the top side of the diaphragm motor control valve is changed varying the control valve downstream pressure until such equilibrium is established. When this equilibrium exists the relationship of the instrument air pressure to the downstream control valve pressure will follow the curve shown in Fig. 9.

By using the clamping rings having different inner diameters, the effective areas of the diaphragms will be varied and practically any range of the downstream control valve fluid pressures can be used in combination with the standard range of control instrument air pressures.

When the fluid controlled is steam and passes, for example from the control valve to a reboiler heater, the potential heat is substantially directly proportional to the control valve downstream pressure. The relay constructed as described may be utilized by substituting a bellows of proper diameter for a diaphragm 63 and changing the cone-like cam member 4, having a square root contour to one having a linear contour.

When the fluid is in liquid form such as hot or cold oil or water flowing through a control valve thence to a heat exchanger having a constant pressure drop, the heat input is regulated by the valve and is not proportional to the control valve downstream pressure but is proportional to the control valve inner valve position. The relay may be used in this connection by substituting air pressure on top of the diaphragm motor control valve instead of the control valve downstream pressure.

From the foregoing it is obvious that I have provided a relatively simple apparatus for translating equal increments of pressure change from a control instrument to equal percentage increments of flow change through the diaphragm motor valve.

It is also obvious that the relay constructed and assembled in accordance with the present invention provides an interconnection between the control instrument and the pressure actuated valve so that there is no hazard brought about through leaking of the controlled fluid to the control instrument.

What we claim and desire to secure by Letters Patent is:

1. A relay including a housing having a diaphragm chamber at one end and a plurality of diaphragm chambers at the other end, diaphragms in said chambers, a cam connected with the diaphragm in the first named chamber, a cam connected with the diaphragms in the last named chambers, a pivoted member having contact with the first named cam and provided with a vent opening, and a flap member pivoted coaxially with the pivoted member and having contact with the other cam member for opening and closing the vent opening responsive to movement of the cam members by said diaphragms.

2. A relay including a housing having a diaphragm chamber at one end and a plurality of diaphragm chambers at the other end, diaphragms in said chambers, a linear cam connected with the diaphragm in the first named chamber, a cam having a square root surface connected with the diaphragms in the last named chambers, a pivoted member having contact with the linear cam and having a vent opening, and a flap member pivoted coaxially with the pivoted member and having contact with the cam having the square root surface for opening and closing the vent opening responsive to movement of the cam members by said diaphragms.

3. A relay including a housing having a diaphragm chamber at one end and a plurality of diaphragm chambers at the other end, diaphragms in said chambers, a linear cam connected with the diaphragm in the first named chamber, a cam having a square root surface connected with the diaphragms in the last named chambers, a pivoted member having contact with the linear cam and having a vent opening, and a flap member pivoted coaxially with the pivoted member and having contact with the cam having the square root surface for opening and closing the vent opening responsive to the movement of the cam members by said diaphragms, a control instrument for applying pressure in the first named diaphragm chamber to position the linear cam, and means for applying opposing pressures to the other diaphragm chambers to position the cam having the square root surface.

4. A relay including a housing having a diaphragm chamber at one end and a plurality of diaphragm chambers at the other end, diaphragms in said chambers, a cam connected with the diaphragm in the first named chamber, a cam connected with the diaphragms in the last named chambers, a pivoted member having contact with the first named cam and having a vent opening, a flap member pivoted coaxially with the pivoted member and having contact with the other cam member for opening and closing the vent opening responsive to position of the cam members, means for supplying an actuating pressure medium to the first named diaphragm chamber, means for supplying an actuating pressure to one of the last named diaphragm chambers, and means for supplying a separate fluid pressure to the pivoted member having the vent opening including means for supplying said separate fluid pressure medium to the other diaphragm chamber of the last named diaphragm chambers for opposing the actuating pressure.

5. A relay including a housing having a diaphragm chamber at one end and a plurality of diaphragm chambers at the other end, diaphragms in said chambers, a cam connected with the diaphragm in the last named chambers, a pivoted member having contact with the first named cam and having a vent opening, a spring for maintaining the pivoted member in contact with said cam, a flap member pivoted coaxially with the pivoted member and having contact with the other cam for opening and closing the vent opening responsive to movement of the cam members by said diaphragms, a spring for maintaining contact of the flap member with said other cam, means for supplying an actuating pressure to the first named diaphragm chamber, means for supplying an actuating pressure to one of the last named diaphragm chambers, and means for supplying fluid pressure to the pivoted member having the vent opening and to the other diaphragm chamber of the last named diaphragm chambers.

6. A relay of the character described, a pair of cam members, a housing having a diaphragm chamber, a diaphragm in said chamber, means for connecting the diaphragm with one of said cam members, said housing also having a pair of diaphragm chambers, diaphragms in the last named chambers, means interconnecting the last named diaphragms, valve members pivoted in the housing on a common axis intermediate the cam members, one of said members having a vent port and the other a flap to open and close said vent port, means on one of the valve members yieldably engaging one of the cam members, means on the other valve member yieldably engaging the other cam member, means connecting said other cam member with the interconnected diaphragms, means for supplying pressure medium to the opposite sides of one of the interconnected diaphragms and to the valve member having the vent port, separate means for supplying separate pressure mediums to the other diaphragms to move said diaphragms in one direction to position valve members through the cam members, and springs for moving the diaphragms in the opposite directions, said first named pressure medium being adapted to act on its diaphragm on one side in opposite direction to the separate pressure medium acting on the interconnected diaphragm.

7. A relay of the character described, a pair of cam members, a housing having a diaphragm chamber, a diaphragm in said chamber, means for connecting the diaphragm with one of said cam members, said housing also having a pair of diaphragm chambers, diaphragms in the last named chambers means interconnecting the last named diaphragms, valve members pivoted in the housing on a common axis intermediate the cam members, one of said members having a vent port and the other a flap to open and close said vent port, means on one of the valve members yieldably engaging one of the cam members, means on the other valve member yieldably engaging the other cam member, means connecting said other cam member with the interconnected diaphragms, means for supplying pressure medium to the opposite sides of one of the interconnected diaphragms and to the valve member having the vent port, separate means for supplying separate pressure mediums to the other diaphragms to move said diaphragms in one direction to position valve members through the cam members, springs for moving the diaphragms in the opposite directions, said first named pressure medium being adapted to act on its diaphragm on one side in opposite direction to the separate pressure medium acting on the interconnected diaphragms, and means for restricting flow of said pressure medium to the opposite side of the diaphragm.

8. A relay of the character described, a pair of cam members, a housing having a diaphragm chamber, a diaphragm in said chamber, means for connecting the diaphragm with one of said cam members, said housing also having a pair of diaphragm chambers, diaphragms in the last named chambers, means interconnecting the last named diaphragms, valve members pivoted in the housing on a common axis intermediate the cam members. one of said members having a vent port and the other a flap to open and close said vent port, means on one of the valve members yieldably engaging one of the cam members, means on the other valve member yieldably engaging the other cam member, means connecting said other cam member with the interconnected diaphragms, means for supplying pressure medium to one side of one of the interconnected diaphragms and to the valve member having the vent port, separate means for supplying separate pressure mediums to the other diaphragms to move said diaphragms in one direction to position valve members through the cam members, and springs for moving the diaphragms in the opposite directions, said first named pressure medium being adapted to act on its diaphragm on one side in opposite direction to the separate pressure medium acting on the interconnected diaphragm.

9. A relay of the character described, a pair of cam members, a housing having a pair of diaphragm chambers, diaphragms in said chambers, means interconnecting the diaphragms, valve members pivoted on a common axis intermediate the cam members, one of said members having a vent port and the other a flap to open and close said vent port, means on one of the valve members yieldably engaging one of the cam members, means on the other valve member yieldably engaging the other cam member, actuating means connected with one of the cam members, means connecting said other cam member with the interconnected diaphragms, means for supplying pressure medium to the opposite sides of one of the interconnected diaphragms and to the valve member having the vent port, and separate means for supplying a separate pressure medium to move the other diaphragm in one direction to position the valve members through the cam member connected therewith, a spring for moving the diaphragms in the opposite directions.

10. A relay of the character described, a pair of cam members, a housing having a pair of diaphragm chambers, diaphragms in said chambers, means interconnecting the diaphragms, valve members pivoted on a common axis intermediate the cam members, one of said members having a vent port and the other a flap to open and close said vent port, means on one of the valve members yieldably engaging one of the cam members, means on the other valve member yieldably engaging the other cam member, actuating means connected with one of the cam members, means connecting said other cam member with the interconnected diaphragms, means for supplying pressure medium to one side of one of the interconnected diaphragms and to the valve member having the vent port, means for restricting flow of said pressure medium to the opposite side of said diaphragm, separate means for supplying a separate pressure medium to the other diaphragm to move said diaphragm in one direction to position valve member actuated by the cam member associated therewith, and springs for moving the diaphragms in the opposite directions.

11. A relay including relatively movable apertured and flap members, means for moving one of the members, a fluid pressure responsive means for moving the other member, a separate fluid pressure responsive means for opposing movement of the member operated by said first named fluid pressure responsive means. means for supplying a pressure medium at the same pressure to both the apertured member and to the opposing fluid pressure responsive means, and means for supplying a restricted supply of said pressure medium to act on the opposing means in cooperation with said first named fluid pressure responsive means whereby the opposing force effected by said opposing means is the differential between the pressure medium supply pressure and said restricted supply pressure.

FOSTER M. POOLE.
HUMES B. MANLEY.

REFERENCES CITED

The following references are of record in the file of this patent:

UNITED STATES PATENTS

| Number | Name | Date |
|---|---|---|
| 1,897,135 | Mason | Feb. 14, 1933 |
| 1,988,348 | Annin | Jan. 15, 1935 |
| 2,050,279 | Dahl | Aug. 11, 1936 |
| 2,427,235 | Smoot | Sept. 9, 1947 |

OTHER REFERENCES

Publication of Mason-Ne'lan Regulator Co., Bulletin #3000—C, page 6, Figure 6.